3,725,029
PREPARATION OF AMMONIUM SULFATE
FERTILIZER CONSTITUENT
Kenneth A. E. Blackmore, Bellingham, Wash., assignor to Georgia-Pacific Corporation, Portland, Oreg.
No Drawing. Filed Sept. 27, 1971, Ser. No. 184,296
Int. Cl. C05c 9/00
U.S. Cl. 71—28                                                             9 Claims

ABSTRACT OF THE DISCLOSURE

A fertilizer constituent of ammonium sulfate for dried fertilizer blending is prepared by granulating the ammonium sulfate in a drum granulator using a concentrated lignosulfonate solution as a binder, coating the granulated particles of ammonium sulfate with molten urea to have the urea solidify upon the surface of the ammonium sulfate particles, and contacting the coated particles with a dry powder as an anti-caking agent.

---

This invention pertains to a process for the preparation of ammonium sulfate for use as a fertilizer constituent. More particularly, it pertains to the preparation of ammonium sulfate in a nitrogen enriched form and in a particle size to be used in dry blending with other fertilizer constituents for the preparation of the fertilizer.

Ammonium sulfate is available in large quantities as a by-product. Many industries are utilizing ammonia or ammonium compounds for the neutralization of waste effluents containing sulfuric acid resulting in large quantities being available for fertilizer use. A large portion of the ammonium sulfate thus produced is in particles of insufficient size and improperly shaped to be dry blended with other fertilizer constituents without segregating from the mixture. To keep from segregating, it is essential that the particles be irregular in shape. Also, even though a particle may be of the same size as other constituents used in the dry blend, the bagging operation and handling in storage and use result in sufficient agitation of the particles to result in stratification of the constituents within the bag or storage container of particles which are spherical or smoothly shaped. Since the fertilizers are blended to correct particular solid deficiencies and provide a balance of nutrients, the uniformity of the fertilizer is thus essential and segregation or stratification of the fertilizer even to a limited extent greatly reduces the effectiveness of the fertilizer. Further, the nitrogen content of the ammonium sulfate is not sufficient for many fertilizer blends to enable the ammonium sulfate to supply the required nitrogen, so that urea or other nitrogen-containing constituents have to be added. Urea likewise is generally available in a small particle size which will settle out from the blend under the conditions normally employed in handling the fertilizers. Due to the hygroscopic properties of urea and ammonium sulfate, pelleting or granulation of the two products is difficult, and involved processes such as prilling in oil of a mix of ammonium sulfate in molten urea have been suggested.

It is, therefore, an object of this invention to provide a process for the preparation of an ammonium sulfate fertilizer constituent which may be used in preparation of fertilizer by dry blending. Another object is to provide a process for the granulation of ammonium sulfate to obtain particles of irregular shaped surface which will not segregate from other fertilizer constituents. A further object is to provide a process for the preparation of the ammonium sulfate in particles having a surface compatible with urea so that the nitrogen content of the ammonium sulfate may be readily increased by coating with molten urea. A still further object is to provide a dry nitrogen fertilizer constituent in the proper particle size and form for dry blending with other fertilizer constituents.

The above and other objects are attained by heating the ammonium sulfate to a temperature in the range of from 90° to 120° C. and granulating the heated ammonium sulfate in a granulator using a concentrated lignosulfonate solution containing from 30 to 55 weight percent solids as a binder. The ammonium sulfate is granulated until the major portion of the particles is in the range of from 4 to 10 mesh. These particles are cooled to a temperature of from ambient to 40° C. and coated with molten urea to cover the particles with solidified urea. The urea coated particles are then concentrated with a dry powder as an anti-caking agent to cover the particles to prevent caking on standing.

In the granulation of ammonium sulfate, the hygroscopic properties and the solubility of ammonium sulfate are controlled to permit granulation by use of a concentrated lignosulfonate solution. In the process, the ammonium sulfate to be granulated is heated to a temperature in the range of from 90° to 120° C. and a heated concentrated lignosulfonate solution containing from 30 to 70 weight percent solids, preferably from 40 to 50 weight percent, is sprayed upon the ammonium sulfate while the heated ammonium sulfate is mixed such as in a rotating drum granulator. Solutions having a concentration greater than 55 percent are used only to a limited extent, since the solutions may be to viscous for convenient handling even at temperatures of from 70° to 90° C. to which the lignosulfonate solutions are heated prior to application. Upon spraying the heated lignosulfonate solution upon the hot ammonium sulfate, water is evaporated from the lignosulfonate solution to have the ammonium sulfate granules become coated with a more concentrated lignosulfonate solution. This concentrated solution provides the adhesive properties for the granulation. The lignosulfonate solution contains sufficient moisture to coat and become attached to the ammonium sulfate granules without excessive solubilization of the product. In the granulation, the ammonium sulfate particles must be maintained at a temperature of at least 90° C. to ensure sufficiently rapid evaporation of the water from the sprayed lignosulfonate solution coating the ammonium sulfate particles to provide the desired agglomeration and drying of the particles. The evaporation of water has a cooling effect so that a source of heat is supplied to maintain the particles being granulated at the desired temperature. In granulating equipment with limited heat source, the lignosulfonate solution may be applied in an intermittent operation permitting the ammonium sulfate to regain the desired temperature between the lignosulfonate solution applications. The granulation is continued until the product has been substantially dried and the major portion of the ammonium sulfate particles is in the range of from 4 to 10 mesh. Generally, the amount of lignosulfonate solution used is from 3 to 10 percent of lignosulfonate solids based upon the ammonium sulfate.

After granulation, the ammonium sulfate particles obtained are irregular in shape and can be used directly in dry blending of fertilizer. However, if it is desirable to further enhance the product by increasing the nitrogen content, the dry agglomerated ammonium sulfate particles are cooled and then coated with molten urea. The urea will adhere to the particles of the granulated ammonium sulfate, since the particles are coated with the lignosulfonate binder which is soluble in urea. The urea coating may be conveniently applied in the granulator in which case some agglomeration takes place increasing somewhat the average particle size of the product. In coating the particles with urea, the agglomerated ammonium sulfate particles are maintained at a temperature below 40° C. so that upon application of the molten urea the urea will freeze or solidify upon the surface of the ammonium sulfate agglomerated particles. The urea may be applied in substantially anhydrous form or small amounts of water or lignosulfonate may be dissolved in the urea to lower the melting temperature. For example, an aqueous solution containing 10 percent water will have a melting point of about 100° C. Also, somewhat better adhesion of the urea to be coated particles is obtained by using urea containing small amounts of water or lignosulfonate.

When a molten aqueous solution of urea is used, it is applied such that the coating would have a concentration of at least 90 percent urea, preferably at least 95 percent. A molten solution of the above concentration may be sprayed upon the ammonium particles as such. However, less concentrated solutions may be used in which case powdered urea is added at the same time so that the urea coating applied will contain at least 90 percent urea or contain not more than 10 percent moisture. While the urea applied may contain relatively large amounts of water, the final product will generally contain from about 0.2 to 0.6 percent moisture. Some drying is obtained in the application, and also the granulated ammonium sulfate, which is substantially dry at the time of urea application, takes up moisture from the coating to lower the moisture content of the coating. The urea-coated product may be also dried to remove small amounts of water to lower the moisture content by contacting the particles, for example, with air heated to about 80° C. after the particles have been coated with an anti-caking agent. The amount of urea added will vary with the nitrogen enhancement desired. Often, it is desirable to have a product which contains from 22 to 28 percent nitrogen. Thus, when this product is then dry blended with other fertilizer constituents the total mix will have the desired nitrogen content.

Since urea is hygroscopic and will absorb moisture from the atmosphere, the urea-coated particles may cake upon standing. Consequently, it is desirable to treat these particles with an anti-caking agent used in treatment of urea to control the caking properties. The anti-caking agent employed may be water-insoluble, inert powders or any of the well-known anti-caking agents such as clay, talc, diatomaceous earth, mica, and other relatively inert materials used for urea. Also, products contributing to the nutritional value of the fertilizer, such as, for example, limestone, sulfur, zinc oxide, powdered nutshells, or a relatively water-insoluble fertilizer constituent in powder form may be preferably used. Relatively a small amount of anti-caking agent has to be used. Generally an amount of from 3 to 5 weight percent is sufficient, but larger amounts may be used for highly humid conditions.

The lignosulfonates used as a binder may be obtained by sulfonation, by the various known methods, of lignin obtained from any source. Lignin is a polymeric substance of substituted aromatics found in plant and vegetable tissue associated with cellulose and other plant constituents. Thus, vegetable and plant tissue are lignin-containing materials which are the principle sources of lignin.

One of the main sources of lignosulfonates is the spent sulfite liquors from the paper and pulp industry where lignocellulosic materials such as wood, straw, corn stalks, bagassee and the like are digested with a bisulfite or sulfite to separate the cellulose or pulp from the lignin. In the process, the lignin is sulfonated and becomes dissolved in the spent digestion liquor which is commonly referred to as "spent sulfite liquor." The lignosulfonate product or spent sulfite liquor generally contains many other constituents beside the sulfonated lignin. These other materials may be removed, but generally the liquors are used without further processing or treatment other than concentration or fermentation or being subjected to relatively mild alkaline, heat or acid treatments. Preferably, it is desirable to have the low molecular weight lignosulfonates and some of the carbohydrates remain in the product, since these materials have a plasticizing effect upon the lignosulfonates improving the adhesive and film forming properties of the product.

The sulfonated lignins obtained upon the sulfonation of lignin may be salts of certain metals such as magnesium, calcium, ammonium, sodium and others. The lignosulfonate or liquor thus obtained may be used as such or converted to salts or complexes of other metals including metals known to have pesticidal properties such as mercury, or nutritional value, such as trace elements as iron, zinc, manganese and others.

EXAMPLE I

A series of runs were made where urea was added before and after granulation of the ammonium sulfate and at different solution concentrations. The ammonium sulfate used was a by-product ammonium sulfate which was of a particle size such that 83 percent of the product was less than 10 mesh. This product was granulated in a rotating drum granulator which was inclined to about 15° to the horizontal plane. The granulator was heated by means of a gas flame applied to the outside of the drum. The ammonium sulfate product in an amount of 500 grams was placed in the drum, which was rotated at about 44 revolutions per minute. The ammonium sulfate was maintained in the rotating drum until the particles were heated to about 110° C. at which time a lignosulfonate solution which had been heated in a hot water bath was sprayed upon the heated mixing ammonium sulfate particles intermittently. The lignosulfonate solution was a fermented calcium-base spent sulfite liquor concentrated to 40 weight percent solids. After spraying a portion of the lignosulfonate solution upon the particles the temperature of the particles was reduced to about 95° C. The application of the lignosulfonate solution was discontinued to permit the granules to be reheated to 110° C. before further additions of lignosulfonate were made. In this manner, the granulation was continued until the product contained about 5 wegiht percent lignosulfonate solids and about 61 percent of the product was in the range of from 4 to 10 mesh.

The ammonium sulfate granulated as described above was cooled to room temperature and placed on the granulator and coated with urea. To 500 grams of the ammonium sulfate, 27.5 grams of urea were added. One-third of the urea was added as an 80 percent molten solution and the remainder as a dry urea powder. The granulated ammonium sulfate and urea powder were intermixed and then the 80 percent urea solution at a temperature of about 90° C. was sprayed upon the mixing or tumbling mixture of granulated ammonium sulfate and urea powder. After the addition of the solution, talc in an amount of about 2.8 percent of the urea-ammonium sulfate mixture was added. The product obtained contained about 21.2 percent nitrogen and was a free-flowing product which remained free from caking upon storage.

The particles of the granulated ammonium sulfate and the urea-coated granulated ammonium sulfate were relatively spherical-type or compact particles with an irregular surface resulting from the projecting portions of the agglomerated particles. These particles were tested for segregation by mixing the granulated material with commercially granulated fertilizer in equal proportions. The blend thus obtained was then placed in a glass jar which was inclined about 45° from the horizontal and subjected for two minutes to an oscillating motion which moved the jar on the incline for a distance of two inches at a frequency of 160 cycles per minute. The product then was observed to see whether any segregation had taken place. Under the above test, no separation of the granulated ammonium sulfate or the coated granulated ammonium sulfate was obtained. However, in repeating the test using the ungranulated ammonium sulfate, most of the fines were found in the lower 50 percent of the mixture. Also, in repeating the test by using the prilled urea, most of the urea settled in the lower 25 percent of the mixture.

Another run was made in coating the granulated ammonium sulfate with urea in a manner similar to that described above, except that the 5 percent urea was added as an 80 percent solution without addition of powdered urea so that the particles were coated with the urea containing 80 percent urea. About 4 percent talc was added as an anti-caking agent. The product obtained was free-flowing; however, upon storage caking was obtained. This was also true when diatomaceous earth was used as an anti-caking agent. With a 50 percent urea solution, the product remained sticky and could not be dried or maintained in granular or particulate form.

A run was also made where the ammonium sulfate was mixed with powdered urea and an attempt made to granulate the mixture using the lignosulfonate solution. The product obtained remained sticky and could not be satisfactorily granulated.

EXAMPLE II

An ammonium sulfate was granulated in the manner described in Example I. The granulated ammonium sulfate was coated with urea by spraying the granules while being tumbled at room temperature with an 80 percent molten solution of urea and then the product was coated with a mixture of powdered urea and sulfur. The urea added as a molten solution represented about one-third of the total urea. The final product obtained contained 21.2 percent nitrogen and about 5.2 percent elemental sulfur. After the powdered urea and sulfur were added, the product was tumbled in the granulator and hot air was blown into the granulator until a temperature of around 80° C. was reached after which cold air was passed into the granulator to cool the product to 40° C. The final product when dry blended with commercial fertilizer did not segregate under the segregation test described in Example I.

EXAMPLE III

The by-product ammonium sulfate described in Example I was granulated in a manner similar to that in Example I to obtain a granulated product of which 94 weight percent was of particles in the range of from 4 to 10 mesh. About 1.5 weight percent of the product was larger than 4 mesh, and 4.5 percent of the product was less than 10 mesh.

To 500 grams of the granulated ammonium sulfate, 253.5 grams of urea were added. One hundred sixty grams of the urea were added as a powder and the remainder as an 80 percent molten aqueous solution at 90° C. The granulated ammonium sulfate was mixed in the granulator at room temperature and the powdered urea was added intermittently while spraying the 80 percent molten solution upon the tumbling particles. After all of the urea had been added and solidified, 45 grams of talc were added to cover the particles with the anti-caking agent. After the addition of the talc, hot air was blown over the product until the temperature reached 80° C. and then cold air was used to lower the temperature to about 50° C. The product obtained was free-flowing and did not cake upon storage. It contained 26.9 percent nitrogen and did not segregate from a dry blend when tested under the method described in Example I.

What is claimed is:

1. A process for the preparation of a fertilizer constituent of ammonium sulfate for dry blending with other fertilizer constituents which comprises heating the ammonium sulfate to a temperature in the range of from 90° to 120° C., mixing the heated ammonium sulfate in a rotating drum granulator, spraying a lignosulfonate solution at a temperature in the range of from 70° to 95° C. on the heated ammonium sulfate in the granulator at a rate such that the temperature of the ammonium sulfate is at least 90° C. to agglomerate the ammonium sulfate until the major portion of the particles is in the range of from 4 to 10 mesh, said lignosulfonate solution having a concentration of from 30 to 70 weight percent solids, cooling the agglomerated ammonium sulfate to a temperature of from ambient to 40° C., coating the cooled, agglomerated ammonium sulfate particles to increase the nitrogen content with the molten urea at a rate such that the urea solution solidifies upon the surface of the agglomerated ammonium sulfate particles, and treating the coated ammonium sulfate particles with an anti-caking agent to sufficiently cover the particles to prevent caking upon standing.

2. A process according to claim 1 wherein the lignosulfonate solution is spent sulfite liquor.

3. A process according to claim 2 wherein the spent sulfite liquor is a fermented spent sulfite liquor having a concentration of from 40 to 50 weight percent solids.

4. A process according to claim 3 wherein the spent sulfite liquor is applied intermittently.

5. A process according to claim 3 wherein the granulated ammonium sulfate is coated with urea containing at least 90 percent urea by being sprayed with a molten aqueous urea solution and contacted with powdered urea.

6. A process according to claim 5 wherein the anti-caking agent is an inert, water-insoluble powder.

7. A process according to claim 6 wherein the particles treated with the anti-caking agent are contacted with heated air to lower the moisture content of the urea-coated particles to less than 0.6 percent.

8. A process according to claim 7 wherein the anti-caking agent is sulfur.

9. A process according to claim 7 wherein the anti-caking agent is talc.

References Cited

UNITED STATES PATENTS

| | | | |
|---|---|---|---|
| 3,353,949 | 11/1967 | Nan | 71—1 X |
| 3,580,715 | 5/1971 | Dilday | 71—64 DBX |
| 2,943,928 | 7/1960 | Guth | 71—64 E |

REUBEN FRIEDMAN, Primary Examiner

R. BARNES, Assistant Examiner

U.S. Cl. X.R.

71—64 DA, 64 E; 423—545